INVENTORS.
WILLIAM H. CARUTHERS, JR
LOUIS E. PENNINGTON

BY *Glenn, Palmer,*
*Matthews & Lyne*

THEIR ATTORNEYS

INVENTORS
WILLIAM H. CARUTHERS, JR
LOUIS E. PENNINGTON

BY Glenn, Palmer,
Matthews & Lyne

THEIR ATTORNEYS

# United States Patent Office 3,433,384
Patented Mar. 18, 1969

3,433,384
CRYOGENIC CONSTRUCTIONS AND METHODS
FOR MAKING THE SAME
William H. Caruthers, Jr., and Louis E. Pennington,
Chesterfield County, Va., assignors to Reynolds
Metals Company, Richmond, Va., a corporation
of Delaware
Filed Aug. 2, 1966, Ser. No. 569,692
U.S. Cl. 220—14                                25 Claims
Int. Cl. B65d 25/18

ABSTRACT OF THE DISCLOSURE

This disclosure relates to means for providing a cryogenic joint between an aluminum containing tubular length and a stainless steel tubular length by telescopically arranging portions of said lengths together and detonating an explosive charge adjacent the telescoping portions to metallurgically bond such telescoping portions together whereby the aluminum containing tubular length can be secured to an inner aluminum storage container and the stainless steel length will be spaced from the aluminum container by the aluminum containing tubular length so that a transition joint of metallic material having a relatively low coefficient of thermal conductivity will be provided between the aluminum storage container and another surrounding container that defines a chamber between the two containers, the stainless steel tubular length being adapted to be operatively interconnectetd to the other container so as to provide fluid flow conduit means between the outside of the outer container and the inside of the inner container.

---

This invention relates to improved cryogenic constructions as well as to improved methods for making the same or the like.

It is well known that liquefield cryogenic fluids or the like are stored in insulated tank constructions whereby the liquefield fluid is periodically drawn from the interior of the tank construction by means of conduits and the like projecting into the tank construction and leading externally therefrom.

However, in view of the tendency of transfer heat from the atmosphere surrounding the tank construction into the interior thereof by conduction through such conduits, the conduits are normally formed of metallic material having a relatively low coefficient of thermal conductivity, such as stainless steel or the like while the tank construction is formed of aluminum-containing metallic material because the same has excellent mechanical properties at cryogenic temperatures, such as its structural "toughness" at subzero temperatures.

However, it is well known that it is relatively difficult to provide a metallurgical joint between such an aluminum-containing metallic tank construction and the stainless steel conduit means therefor.

In the past, attempts were made to provide a brazed joint between the stainless steel member and the aluminum-containing metallic material. However, it has been found that such joint construction is relatively brittle whereby normal vibrations caused by transporting such cryogenic tank constructions caused the brittle joints to fracture and fail.

Similarly, attempts were made to provide a friction welded butt-joint between the stainless steel and aluminum members, but the same adverse result of a brittle joint was created therebetween.

A successful transition joint between the aluminum-containing metallic material and the stainless steel conduit means has been previously provided by forming a tri-metallic joint wherein the stainless steel member is flash welded to a copper segment, and the copper segment, in turn, is flash welded to the aluminum-containing metallic member. While this tri-metallic transition joint construction provides a ductile joint construction which will not be subjected to adverse effects during vibrations of the completed tank construction, this tri-metallic transition joint not only has a relatively high fabrication cost, but also this tri-metallic transition joint construction requires that the tri-metallic joint be completely disposed between the inner and outer tanks of the cryogenic tank construction whereby the tri-metallic joint requires considerable space between the inner and outer tanks to accommodate the same so that a space problem is created by this prior known joint construction.

However, according to the teachings of this invention, an improved transition joint construction is provided between a stainless steel member or the like and an aluminum-containing metallic member in such a manner that the joint is fully adapted to withstand vibrations, shocks and the like without requiring an intermediate metallic coupling material as in the aforementioned tri-metallic joint construction.

In particular, this invention provides a direct metallurgical bond between an aluminum-containing metallic member and a ferrous-containing metallic member, the metallurgical bond being provided solely by a detonated explosive charge in a manner hereinafter set forth.

Accordingly, it is an object of this invention to provide an improved cryogenic construction having one or more of the novel features set forth above or hereinafter shown or described.

A further object of this invention is to provide an improved method for making such a cryogenic construction or the like, the method of this invention having one or more of the novel features set forth above or hereinafter shown or described.

Other objects, uses and advantages of this invention are apparent from a reading of this description, which proceeds with reference to the accompanying drawings forming a part thereof and wherein.

Figure 1:
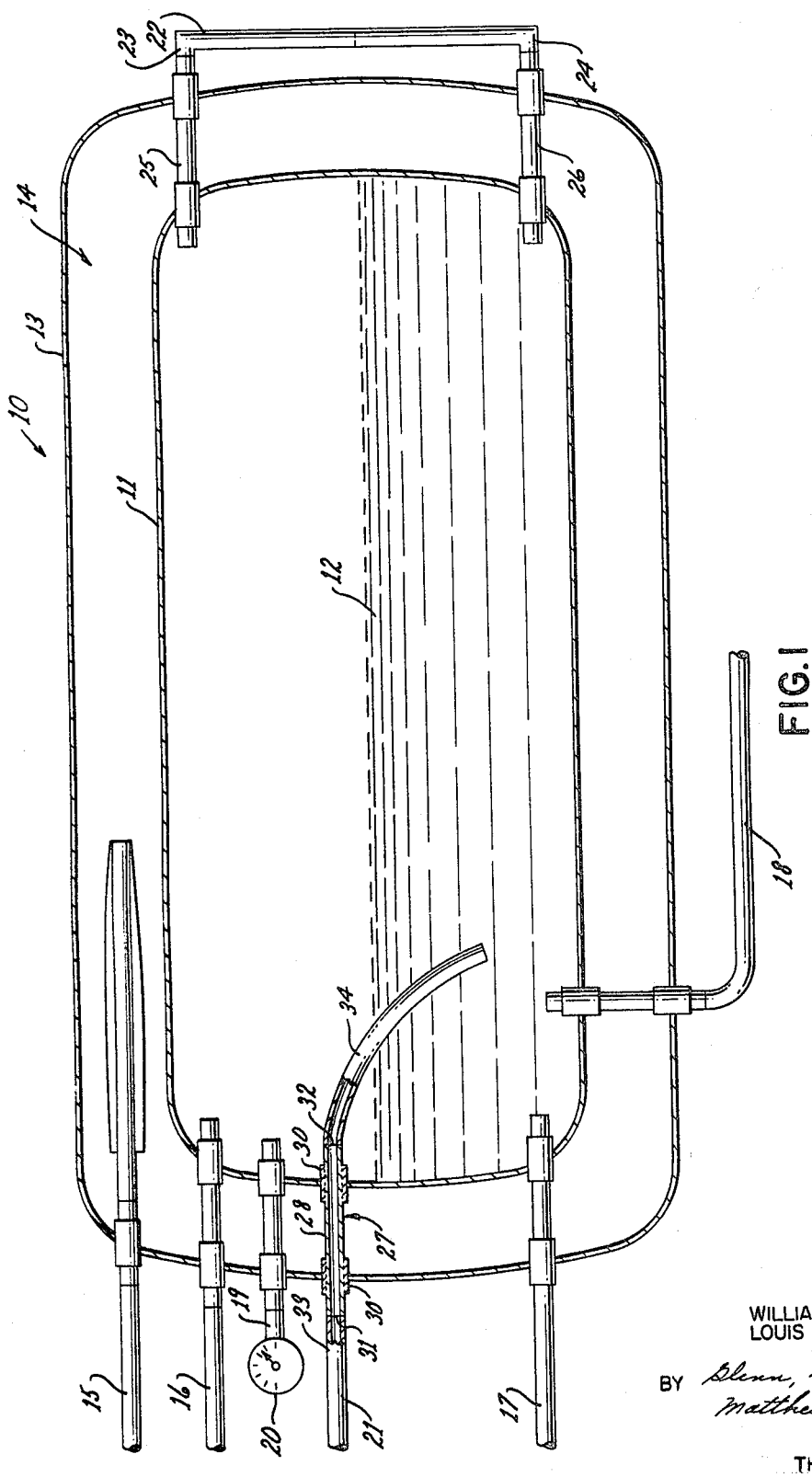
FIGURE 1 is a schematic cross-sectional view illustrating the improved cryogenic tank construction of this invention.

While the various features of this invention are hereinafter described and illustrated as being particularly adaptable for use with liquefied cryogenic fluids or the like, it is to be understood that the various features of this invention can be utilized singly or in any combination thereof for other purposes as desired.

Therefore, this invention is not to be limited to only the embodiments thereof illustrated in the drawings, because the drawings are merely utilized to illustrate one of the wide variety of uses of this invention.

Referring now to FIGURE 1, an improved cryogenic tank construction of this invention is generally indicated by the reference numeral 10 and comprises an inner metallic container or tank 11 containing a liquefied cryogenic fluid 12 and being completely surrounded and supported by an outer metallic container or tank 13 whereby a compartment 14 is defined between the containers 11 and 13.

While the containers 11 and 13 can be formed of any suitable material and in any suitable manner, the containers 11 and 13 of the embodiment illustrated in FIGURE 1 are formed of aluminum-containing metallic material whereby the containers 11 and 13 have the aforementioned excellent mechanical properties for cryogenic temperatures, such as its structural "toughness" at the sub-zero temperatures required for liquefied cryogenic fluids.

In order to insulate the liquefied cryogenic fluid 12 from the heat of the atmosphere surrounding the outer container or tank 13, a vacuum can be imposed in the compartment 14 by a pipe or conduit means 15 projecting into the compartment 14, the pipe or conduit means 15 being interconnected to a suitable suction means which periodically imposes a vacuum condition in the compartment 14.

In addition, suitable insulating means can be disposed in the compartment 14 for preventing heat transfer between the containers 13 and 11. For example, such insulating material can be Perlite.

Various other pipes or conduit means must pass from the exterior of the outer container or tank 13 into the interior of the inner container or tank 11 for various purposes.

For example, should the cryogenic storage means 10 of this invention be utilized for holding liquefied oxygen or the like for hospital uses, it has been found that a conduit means 16 must pass from the exterior of the container or tank 13 into the interior of the container 11 in the vapor region thereof so that oxygen in gaseous form can be drawn, if needed, from the storage means 10 and be conveyed to various parts of the hospital for well known uses thereof.

In addition, a conduit means 17 may be provided and lead from the exterior of the container 13 to the interior of the container 11 below the liquid level thereof so that liquid oxygen or the like can be drawn off as desired by the conduit means 17 and be conveyed to various parts of the hospital for other well known uses thereof.

Similarly, a conduit means 18 can be provided and lead from the exterior of the container 13 to the interior of the container 11 below the liquid level thereof so that liquefied oxygen can be drawn off as needed to furnish supplies on mobile units and the like, the conduit means 18 having suitable heater means therein outboard of the container 13 to change the liquid oxygen to gas, or the mobile units themselves may contain such heater means in the manner well known in the art.

Further, a suitable conduit means 19 may be provided to interconnect the interior of the container 11 with an exteriorly mounted pressure indicating device 20 to determine the pressure within the container 11. Similarly, a conduit means 21 may be provided and lead from a suitable exteriorly mounted relief valve to the interior of the container 11 to prevent pressure of the gas within the container 11 from exceeding a predetermined amount. However, as illustrated in FIGURE 1, the conduit means 21 has its inlet below the liquid level to illustrate means for drawing off liquid.

Also, it may be desired to provide a liquid level gage 22 externally of the container 13, the gage 22 having opposed conduit legs 23 and 24 respectively interconnected to conduit means 25 and 26 of this invention. The conduit means 25 and 26 respectively pass from the exterior of the container 13 into the interior of the inner tank 11.

Therefore, it can be seen that various conduit means extend from the exterior of the outer container 13 into the interior of the inner container 11 whereby the same would be readily adapted to transmit heat from the exterior of the container 13 to the interior of the container 11 whereby such transferred heat would tend to adversely "boil" the liquefied cryogenic fluid 12.

Accordingly, such conduits cannot normally be made of aluminum-containing metallic material or the like because the same have a relatively high coefficient of thermal conductivity that results in above described adverse heat transfer problem.

However, since the containers 11 and 13 are formed of aluminum-containing metallic material, the heat transfer problem cannot be readily solved by using stainless steel conduit means that have relatively low coefficients of thermal conductivity because it is relatively difficult to secure such conduit means to aluminum-containing metallic material without creating a brittle joint therebetween that will fracture and fail during normal vibrations, shocks and the like.

As previously stated, this invention provides conduit means which can be readily secured to the inner and outer tanks 11 and 13, while still being formed of metallic material, having a relatively low coefficient of thermal conductivity so as to prevent heat transfer from the exterior of the outer container 13 to the interior of the inner container 11.

In particular, reference is made to the conduit means 21 of FIGURE 1 and conduit section 27 thereof in FIGURE 2 wherein the conduit means 21 is formed from a length 28 of metallic material having a relatively low coefficient of thermal conductivity, such as stainless steel or the like, having the exterior surface 29 thereof metallurgically bonded to a pair of outer aluminum-containing metallic collars 30 in a manner hereinafter described without a brittle joint therebetween.

The aluminum-containing metallic collars 30 are so positioned and secured to the stainless steel tube 28 that the same are adapted to be respectively secured to the inner container 11 and outer container 13 of the tank construction 10 of this invention in any suitable manner well known for securing one aluminum-containing metallic member to other aluminum-containing metallic member, such as by welding or the like.

Thus, it can be seen that the opposed ends 31 and 32 of the conduit section 27 respectively extend externally of the outer container 13 and interiorly of the inner container 11 while separating the containers 11 and 13 by a portion of the pipe 28 intermediate the collars 30 so that the tanks 11 and 13 have a transition joint therebetween of a metallic material having a relatively low coefficient of thermal conductivity to prevent ready heat transfer between the exterior of the tank 13 and the interior of the tank 11 for the reasons previously set forth.

In addition, the aluminum-containing metallic collars 30 on the conduit section 27 readily permit the conduit section 27 to be directly secured to the inner and outer tanks 11 and 13 in a simple and economical manner not available when an attempt is made to secure the stainless steel conduit 28 directly to the inner and outer aluminum-containing metallic tanks 11 and 13 for the reasons previously set forth.

If desired, additional conduit sections formed of any metallic material that is compatible for securement to the stainless steel pipe 28 can be readily attached to the opposed ends 31 and 32 thereof without destroying the effect of the improvement of the transition conduit section 27 of this invention. For example, it can be seen in FIGURE 1 that another pipe 33 is joined to the end 31 of the pipe 28 exteriorly of the outer tank 13, while an inner pipe 34 is joined to the inner end 32 of the pipe 28 interiorly of the container 11.

Figure 2:
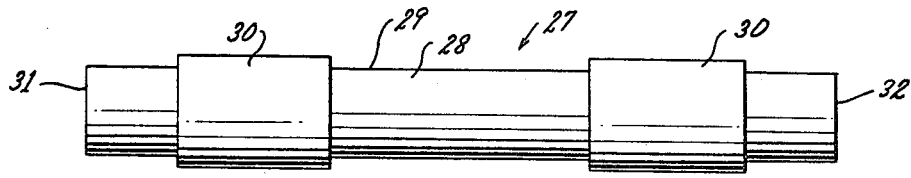
FIGURE 2 is a side view of an improved conduit section for the tank construction of FIGURE 1.

Therefore, it can be seen that the conduit means 16, 17, 18, 19, 21, 25 and 26 illustrated in FIGURE 1 can be formed of conduit sections similar to the conduit section 27 illustrated in FIGURE 2 in order to permit fluid connections between the exterior of the outer container 13 and the interior of the inner container 11 without the adverse effect of heat transfer therebetween.

In regards to the conduit means 15 of FIGURE 1, it can be seen that only one collar 30 is provided on the stainless steel pipe 28 because the conduit means 15 does not interconnect to the inner tank construction 11.

The method for forming the transition joint construction 27 of this invention will now be described wherein the aluminum collars 30 are metallurgically bonded to the stainless steel pipe 28 in such a manner that a relatively ductile joint is provided therebetween to prevent fracture and cracking thereof during subsequent vibrations of the tank construction 10 of this invention.

Figure 3:
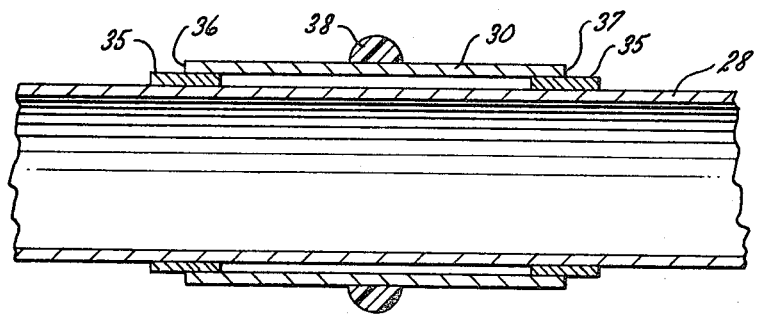
FIGURE 3 is an enlarged, fragmentary, cross-sectional view illustrating one of the steps in the method of this invention for forming the joint construction of FIGURE 2.

In particular, reference is now made to FIGURE 3 wherein, initially, the aluminum-containing metallic collar 30 is disposed in telescoping relation onto the stainless steel pipe 28 in the desired position relative thereto, the initial internal diameter of the collar 30 being greater than the external diameter of the pipe 28 in the manner illustrated in FIGURE 3 whereby suitable shim or spacer means 35 can be disposed therebetween at the opposed ends 36 and 37 of the collar 30 to hold the collar 30 in spaced relation about the entire periphery of the pipe 28.

Thereafter, a suitable explosive charge 38 is wrapped substantially centrally around the collar 30 and is subsequently detonated whereby the resulting shock waves of the explosion radially shrink and metallurgically bond the aluminum-containing metallic collar 30 directly onto the stainless steel pipe 28 in the manner illustrated in FIGURE 4 to effectively secure the collar 30 to the pipe 28.

Figure 5:
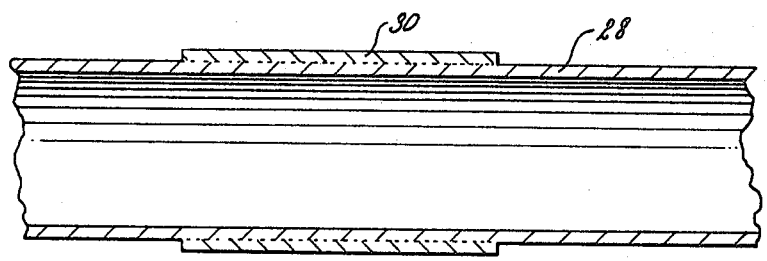
FIGURE 5 is a view similar to FIGURE 3 and illustrates the completed joint construction of this invention.

Thereafter, the unbonded and opposed ends 36 and 37 of the outer collar 30 are machined or cut away in any suitable manner, as illustrated in FIGURE 5, to complete the joint construction of this invention.

Figure 4:
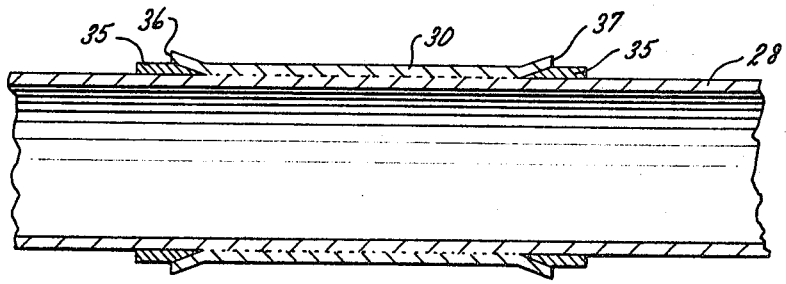
FIGURE 4 is a view similar to FIGURE 3 and illustrates another step in the method of this invention.

Of course, when more than one collar 30 is to be utilized with each pipe 28, such as in the pipe section 27 illustrated in FIGURE 2, each collar 30 is metallurgically bonded to the stainless steel pipe 28 by the method illustrated in FIGURES 3–5.

Therefore, it can be seen that the conduit sections 27 of this invention are formed in such a manner that the aluminum-containing metallic collars 30 are permanently secured to the stainless steel section 28 by a metallurgical bond in a simple and effective manner while still providing a substantially ductile zone at the point of securement therebetween so that vibrations and shocks will not fracture or adversely affect the same.

In this manner, the aluminum-containing metallic collars 30 can be directly secured to the aluminum-containing metallic containers 11 and 13 as illustrated in FIGURE 10 in a simple and effective manner not available for securing stainless steel to aluminum-containing metallic material.

In this manner, it can be seen that the conduit sections 27 of this invention prevent heat transfer between the inner and outer containers 11 and 13 because the same are separated by the pipe 28 intermediate the adjacent collars 30 with the pipe 28 being formed of a metallic material having a relatively low coefficient of thermal conductivity.

One example of a successful conduit section 27 of this invention has been provided by explosively bonding a 2 inch aluminum collar 30 of aluminum alloy 6061–T6 having an O.D. of 1.5000 inches and an I.D. of 1.040 inches in the above manner onto a 16 inch stainless steel pipe 28 of stainless steel type 304 having an O.D. of 1 inch and a wall thickness of 0.020 o fan inch. However, this example is not for the purpose of limiting this invention and is merely to illustrate one type of joint construction of this invention suitable for the storage tank construction 10 of this invention.

Further, while the terms "aluminum-containing metallic material" and "stainless steel" are utilized throughout this specification and claims, it is to be understood that such terms are to encompass and cover equivalents thereof.

It is to be understood that if the inner container 11 or outer container 13 is formed of a metallic material other than aluminum-containing metallic material, such as stainless steel or the like, the conduit means of this invention can be formed in the manner previously described except that only one aluminum-containing metallic collar 30 need be provided for subsequent securement to the aluminum-containing metallic tank as the stainless steel portion of the conduit means can be directly secured to the stainless steel tank without the aforementioned problems.

Figure 6:
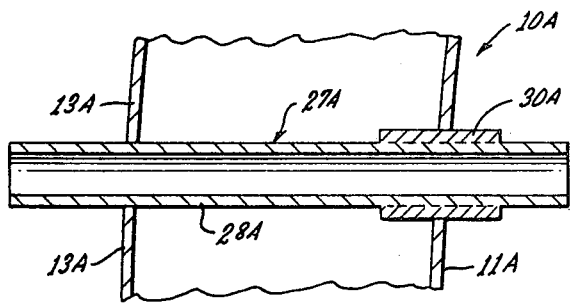
FIGURE 6 is a fragmentary, cross-sectional view of another cryogenic tank construction of this invention.

For example, reference is now made to FIGURE 6 wherein another tank construction of this invention is generally indicated by the reference numeral 10A and parts thereof identical to the tank construction 10 previously described are indicated by like reference numerals formed by the reference letter A.

As illustrated in FIGURE 6, the tank construction 10A includes an inner container 11A formed of aluminum-containing metallic material while the outer container or tank 13A is formed of stainless steel or carbon steel whereby the conduit section 27A of this invention has only one aluminum-containing metallic collar 30A thereon for joining to the inner tank 11A while the outer tank 13A can be joined to the stainless steel conduit 28A in a direct manner by any well known method, such as welding or the like. In this manner, the conduit section 27A still provides a transition joint between the outer tank 13A and the inner tank 11A in the manner previously described.

While the conduit sections of this invention have been previously described as having the stainless steel pipe 28 or 28A provided with an end projecting beyond the inner collar 30 or 30A thereof for subsequent securement to additional conduit means extending into the inner container 11A, it is to be understood that the inner collar means 30 or 30A could form inner piping means inside the inner container means 11 or 11A.

Figure 7:
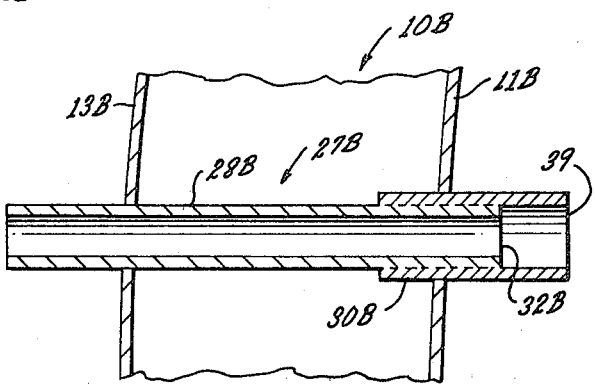
FIGURES 7–9 are respectively views similar to FIGURE 6 and illustrate other cryogenic tank constructions of this invention.

For example, reference is now made to FIGURE 7 wherein another cryogenic storage tank construction of this invention is generally indicated by the reference numeral 10B and parts thereof similar to the previously described tank constructions 10 and 10A are indicated by like reference numerals followed by the reference letter B.

As illustrated in FIGURE 7, the tank construction 10B is formed from an inner container 11B formed of aluminum-containing metallic material while the outer tank or container 13B is formed from stainless steel or the like whereby the conduit section 27B has only one aluminum-containing collar means 30B thereon to be joined to the inner tank 11B in the manner previously described, the stainless steel conduit 28B being directly joined to the outer metallic tank 13B in the manner previously described.

However, the collar means 30B illustrated in FIGURE 7 extends beyond the right-hand end 32B of the stainless steel pipe 28B and can be of any desired length to be joined at its end 39 to additional aluminum-containing metallic piping or be of such a length that the collar means 30B can provide the entire internal piping inside the container 11B.

For example, the collar means 30B can be relatively long and joined to the stainless steel pipe 28B by the previously described explosive means 38 while the collar means 30B is coaxial with the stainless steel pipe 28B. However, thereafter, the portion of the collar 30B extending to the right from the end 32B of the stainless steel pipe 28B can be subsequently bent into any desired configuration, such as in the manner illustrated by the conduit means 34 of FIGURE 1, to provide internal piping inside the container 11B without requiring further joint constructions and the like.

While all the previous embodiments of this invention have illustrated the aluminum-containing collar as being telescoped onto the stainless steel conduit 28 to be subsequently bonded thereto by inwardly shrinking the collar means 30 with the detonated charge 38, it is to be understood that the collar means 30 of this invention can be, initially, loosely telescoped inside the end of the stainless steel pipe 28 and be spaced therefrom by suitable shim or spacer means so that an explosive charge placed inside the collar means 30 can outwardly radially expand the collar means 30 to metallurgically bond the same to the inside peripheral surface of the stainless steel pipe 28 in the manner previously described, a subsequent cutting or trimming operation removing the unbonded ends of the telescoped portions.

Figure 8:
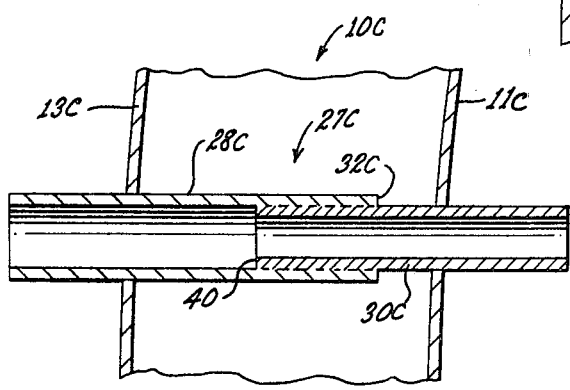

For example, another cryogenic storage tank construction for this invention is generally indicated by the reference numeral 10C in FIGURE 8 and parts thereof identical to the previously described tank construction are indicated by like reference numerals followed by the reference letter C.

As illustrated in FIGURE 8, the storage tank construction 10C of this invention is formed from an inner aluminum-containing metallic tank 11C and an outer stainless steel tank 13C while the conduit means 27C of this invention is formed from a stainless steel pipe 28C having an aluminum-containing metallic collar means 30C provided with an end 40 telescoped within the right-hand end 32C thereof and metallurgically bonded thereto by the internal detonation of an explosive charge in the manner previously described whereby the collar means 30C can be joined directly to the inner aluminum-containing metallic tank 11C and the stainless steel pipe 28C can be joined to the outer metallic tank 13C to provide a transition joint between the inner and outer tanks 11C and 13C for the reasons previously described.

If desired, the collar means 30C can be of any desired length in the manner previously described for the collar means 30B of FIGURE 7.

Of course, it is to be understood that should both the inner and outer tanks 11C and 13C of the tank construction 10C be formed of aluminum-containing metallic material, the collar means 30C can be provided at the opposed ends of the stainless steel pipe 28C in the manner previously described so that the collar means 30C can be respectively secured to the inner and outer tanks 11C and 13C in the manner previously described.

While the conduit means of this invention have been previously described as providing fluid flow means directly therethrough, it is to be understood that the conduit means of this invention can also be utilized to provide supporting means for a plurality of inner conduit means.

Figure 9:
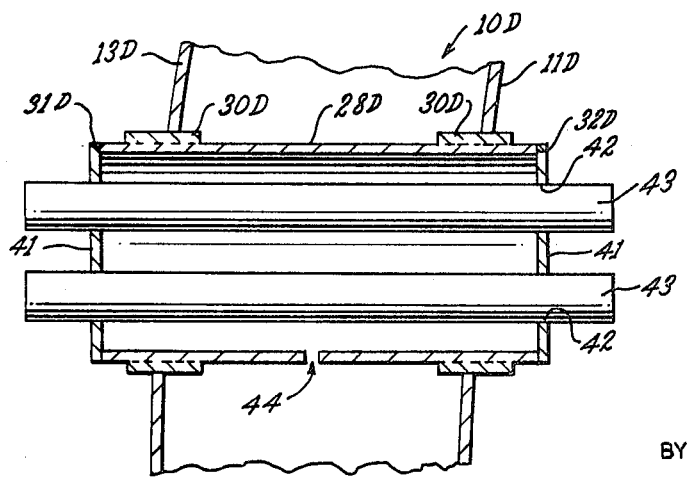

For example, reference is now made to FIGURE 9 wherein another cryogenic storage tank construction of this invention is generally indicated by the reference numeral 10D and parts thereof similar to parts previously described are indicated by like reference numerals followed by the reference letter D.

As illustrated in FIGURE 9, the cryogenic storage tank construction 10D comprises an inner aluminum-containing metallic tank 11D and an outer aluminum-containing metallic tank 13D. A stainless steel conduit 28D has a pair of aluminum-containing metallic collars 30D metallurgically secured thereto in the manner previously described so that the collars 30D can be respectively secured to the inner and outer tanks 11D and 13D in the manner previously described.

However, a pair of stainless steel end plates 41 are respectively secured to the opposed ends 31D and 32D by welding or the like to close the opposed ends of the stainless steel pipe 28D, the end plates 41 respectively having a plurality of apertures 42 passing therethrough in aligned relation so that smaller stainless steel pipes 43 can pass therethrough to interconnect the exterior of the tank 13D with the interior of the tank 11D.

In this manner, a transition joint is formed between the tanks 13D and 11D in the manner previously described and the plurality of conduits 43 can serve the function of one or more of the previously described conduits in the storage tank construction 10 of FIGURE 1.

In order to fully insulate the area between the tanks 11D and 13D, the stainless steel pipe 28D can be provided with one or more openings 44 intermediate the collars 30D so that when a vacuum is imposed in the chamber 14D between the tanks 11D and 13D, the interior of the conduit 28D can also be evacuated. Of course, the interior of the conduit 28D can also be filled with insulating material similar to the insulating material that may be disposed in the chamber 14D.

Therefore, it can be seen that this invention not only provides cryogenic storage tank constructions for storing low temperature cryogenic fluids and the like but also this invention provides improved cryogenic joint constructions or the like.

In addition, this invention provides improved methods for making such cryogenic storage tank constructions and improved methods for making such cryogenic joint constructions or the like.

While the form of the invention now preferred has been disclosed as required by the statutes, other forms may be used, all coming within the scope of the claims which follow.

What is claimed is:

1. A cryogenic joint construction comprising a first tubular length of aluminum-containing metallic material having opposed ends, and a second tubular length of stainless steel material having opposed ends, said lengths being telescopically arranged so that the entire length of said first tubular length surrounds said second tubular length with the opposed ends of said first tubular length being respectively disposed axially inward of said opposed ends of said second tubular length, said tubular lengths being metallurgically bonded together throughout the entire length of said first tubular length whereby the said opposed ends of said second tubular length respectively extend axially outwardly from said opposed ends of said first tubular length.

2. A cryogenic joint construction as set forth in claim 1 and including a third tubular length of aluminum-containing metallic material having opposed ends, said second and third lengths being telscopically arranged so that at least a portion of one of said second and third lengths surrounds at least a portion of the other of said second and third lengths, said last-named portions having been metallurgically bonded together.

3. A cryogenic joint construction as set forth in claim 2 wherein said third tubular length is telescopically disposed onto said second tubular length with the opposed ends of said third tubular length being respectively disposed inboard of said opposed ends of said second tubular length and having the entire length thereof metallurgically bonded to said second tubular length, said first and third tubular lengths being in spaced aligned relation on said second tubular length.

4. A cryogenic joint construction comprising a first tubular length of aluminum-containing metallic material, a second tubular length of stainless steel material, said lengths being telescopically arranged so that at least a portion of one of said tubular lengths surrounds at least a portion of the other tubular length, said portions being metallurgically bonded together, a third tubular length of aluminum-containing metallic material, said second and third lengths being telescopically arranged so that at least a portion of one of said second and third lengths surrounds at least a portion of the other of said second and third lengths, said last-named portions being metallurgically bonded together, said first and third tubular lengths being telescopically disposed onto said second tubular length and having the entire lengths thereof metallurgically bonded to said second tubular length, said first and third tubular lengths being in spaced aligned relation on said second tubular length, and a pair of end plate members respectively secured to the opposed ends of said second tubular length to close said ends, said end plate members each having aperture means passing therethrough and aligned with aperture means in the other of said end plate members whereby conduit means can be inserted through said joint construction by being received in said aligned aperture means.

5. A method for making a cryogenic joint construction or the like comprising the steps of providing a first tubular length of aluminum-containing metallic material, providing a second tubular length of stainless steel material, telescopically arranging said lengths so that the entire length of said first tubular length surrounds said second tubular length with the opposed ends of said first tubular length respectively being disposed axially inward of the opposed ends of said second tubular length, and metallurgically bonding said tubular lengths together solely by detonating an explosive charge adjacent the outer surface of said first tubular length and circumferentially about the same intermediate the opposed ends of said first tubular length whereby the opposed ends of said second tubular length respectively extend axially outwardly from the opposed ends of said secured first tubular length.

6. A method as set forth in claim 5 wherein said bonding step includes the step of metallurgically bonding substantially the entire length of said first tubular length to said second tubular length by said denoted explosive charge.

7. A method as set forth in claim 5 and including the steps of providing a third tubular length of aluminum-containing metallic material, telescoping said second and third lengths so that at least a portion of one of said second and third lengths surrounds at least a portion of the other of said second and third lengths, and metallurgically bonding said last-named portions together solely by detonating another explosive charge adjacent said last-named portions.

8. A method as set forth in claim 7 wherein said telescoping steps include the steps of telescopically disposing said first and third tubular lengths onto said second tubular length in axially spaced apart and aligned relation with the opposed ends of said third tubular length being respectively disposed axially inward of the opposed ends of said second tubular length, and wherein said last-named bonding step includes the step of metallurgically bonding substantially the entire length of said third tubular length to said second tubular length by said detonated explosive charge that is disposed circumferentially about and intermediate the opposed ends of said third tubular length whereby said first and third tubular lengths are disposed in axially spaced apart and aligned relation on said second tubular length.

9. A method as set forth in claim 5 wherein said telescoping step includes the step of telescopically arranging said lengths in spaced concentric relation, and wherein said bonding step includes the step of radially moving said first tubular length toward said second tubular length by the shock waves of said detonated explosive charge to metallurgically bond said lengths together.

10. A method as set forth in claim 9 wherein said step of telescopically arranging said lengths includes the step of placing spacer means between said telescoped lengths at the opposed ends of said first tubular length.

11. A method as set forth in claim 10 and including the step of cutting away the opposed ends of said first tubular length after said bonding step.

12. A method for making a cryogenic joint construction or the like comprising the steps of providing a first tubular length of aluminum-containing metallic material, providing a second tubular length of stainless steel material, telescopically arranging said lengths so that at least a portion of one of said tubular lengths surrounds at least a portion of the other tubular length, metallurgically bonding said portions together solely by detonating an explosive charge adjacent said portions, providing a third tubular length of aluminum-containing metallic material, telescoping said second and third lengths so that at least a portion of one of said and third lengths surrounds at least a portion of the other of said second and third lengths, metallurgically bonding said last-named portions together solely by detonating another explosive charge adjacent said last-named portions, said telescoping steps include the steps of telescopically disposing said first and third tubular lengths onto said second tubular length in spaced apart and aligned relation, said bonding steps include the step of metallurgically bonding substantially the entire lengths of said first and third tubular lengths to said second tubular length by said detonated explosive charges whereby said first and third tubular lengths are disposed in spaced apart and aligned relation on said second tubular length, providing a pair of end plate members, respectively securing said end plate members to the opposed ends of said second tubular length to close said ends, and providing aperture means passing through said end plate members in aligned relation so that conduit means can be inserted through said joint construction by being received in said aligned aperture means.

13. A cryogenic storage tank construction comprising an inner container for containing cryogenic fluid or the like, an outer container surrounding said inner container in spaced relation therewith to define a chamber therebetween, at least one of said containers being of aluminum-containing metallic material, and a conduit means passing from the exterior of said outer container into the interior of said inner container, said conduit means including a first tubular length of aluminum-containing metallic material secured to said one container, said conduit means including a second tubular length of stainless steel material operatively interconnected to said other container, said lengths being telescopically arranged so that at least a portion of said first tubular length surrounds a portion of said second tubular length, said portions having been metallurgically bonded together, said second tubular length spacing said first tubular length from said other container in said chamber whereby a transition joint of metallic material having a relatively low coefficient of thermal conductivity is provided between said containers in said chamber, said second tubular length extending from inside said inner container to the outside of said outer container.

14. A cryogenic storage tank construction as set forth in claim 13 wherein said conduit means includes a third tubular length of aluminum-containing metallic material secured to said other container to operatively interconnect said second tubular length to said other container, said second and third lengths being telescopically arranged so that at least a portion of one of said second and third lengths surrounds at least a portion of the other of said second and third lengths, said last-named portions being metallurgically bonded together.

15. A cryogenic storage tank construction comprising an inner container for containing cryogenic fluid or the like, an outer container surrounding said inner container in spaced relation therewith to define a chamber therebetween, at least one of said containers being of aluminum-containing metallic material, and a conduit means passing from the exterior of said outer container into the interior of said inner container, said conduit means including a first tubular length of aluminum-containing metallic material secured to said one container, said conduit means including a second tubular length of stainless steel material operatively interconnected to said other container, said lengths being telescopically arranged so that at least a portion of one of said tubular lengths surrounds at least a portion of the other tubular length, said portions being metallurgically bonded together, said second tubular length spacing said first tubular length from said other container in said chamber whereby a transition joint of metallic material having a relatively low coefficient of thermal conductivity is provided between said containers in said chamber, said first tubular length being telescoped onto said second tubular length and having the entire length thereof metallurgically bonded to said second tubular length.

16. A cryogenic storage tank construction comprising an inner container for containing cryogenic fluid or the like, an outer container surrounding said inner container in spaced relation therewith to define a chamber therebetween, at least one of said containers being of aluminum-containing metallic material, and a conduit means passing from the exterior of said outer container into the interior of said inner container, said conduit means including a first tubular length of aluminum-containing metallic material secured to said one container, said conduit means including a second tubular length of stainless steel material operatively interconnected to said other container, said lengths being telescopically arranged so that at least a portion of one of said tubular lengths surrounds at least a portion of the other tubular length, said portions being metallurgically bonded together, said second tubular length spacing said first tubular length from said other container in said chamber whereby a transition joint of metallic material having a relatively low coefficient of thermal conductivity is provided between said containers in said chamber, said conduit means including a third tubular length of aluminum-containing metallic material secured to said other container to operatively interconnect said second tubular length to said other container, said second and third lengths being telescopically arranged so that at least a portion of one of said second and third lengths surrounds at least a portion of the other of said second and third lengths, said last-named portions being metallurgically bonded together, said first and third tubular lengths being telescopically disposed onto said second tubular length and having the entire lengths thereof metallurgically bonded to said second tubular length, said first and third tubular lengths being in spaced apart and aligned relation on said second tubular length whereby said second tubular length spaces said first and third tubular lengths from each other in said chamber.

17. A cryogenic storage tank construction as set forth in claim 16 and including a pair of end plate members respectively secured to the opposed ends of said second tubular length to close said ends, said end plate members each having an aperture passing therethrough and aligned with an aperture in the other of said end plate members, and other conduit means inserted through said first-named conduit means by being received in said aligned apertures to fluidly interconnect the exterior of said outer container with the interior of said inner container.

18. A method for making a cryogenic storage tank construction comprising the steps of providing an inner container for containing cryogenic fluid or the like, providing an outer container surrounding said inner container in spaced relation therewith to define a chamber therebetween, forming at least one of said containers of aluminum-containing metallic material, providing a conduit means passing from the exterior of said outer container into the interior of said inner container, providing a first tubular length of aluminum-containing metallic material to form part of said conduit means, providing a second tubular length of stainless steel material to form another part of said conduit means, telescopically arranging said lengths so that at least a portion of said first tubular length surrounds at least a portion of said second tubular length, metallurgically bonding said portions together solely by detonating an explosive charge adjacent said portions, securing said first tubular length to said one container so that said second tubular length extends from the inside of said inner container to the outside of said outer container, and operatively interconnecting said second tubular length to said other container whereby said second tubular length spaces said first tubular length from said other container in said chamber so that a transition joint of metallic material having a relatively low coefficient of thermal conductivity is provided between said containers in said chamber.

19. A method as set forth in claim 18 wherein said bonding step includes the step of metallurgically bonding substantially the entire length of said first tubular length to said second tubular length by said detonated explosive charge.

20. A method as set forth in claim 18 and including the steps of providing a third tubular length of aluminum-containing metallic material, telescoping said second and third lengths so that at least a portion of one of said second and third lengths surrounds at least a portion of the other of said second and third lengths, metallurgically bonding said last-named portions together solely by detonating another explosive charge adjacent said last-named portions, and securing said third length to said other container to operatively interconnect said second length thereto.

21. A method as set forth in claim 20 wherein said telescoping steps include the steps of telescopically disposing said first and third tubular lengths onto said second tubular lengths in spaced apart and aligned relation, and wherein said bonding steps include the steps of metallurgically bonding substantially the entire lengths of said first and third tubular lengths to said second tubular length by said detonated explosive charges whereby said first and third tubular lengths are respectively secured to said containers and are disposed in spaced apart and aligned relation on said second tubular length.

22. A method as set forth in claim 18 wherein said telescoping step includes the step of telescopically arranging said portions in spaced concentric relation, and wherein said bonding step includes the step of radially moving said portion of said first tubular length toward said portion of said second tubular length by the shock waves of said detonated explosive charge to metallurgically bond said portions together.

23. A method as set forth in claim 22 wherein said step of telescopically arranging said portions includes the step of placing spacing means between said telescoped portions at the opposed ends thereof.

24. A method as set forth in claim 23 and including the step of cutting away the opposed ends of said bonded portions.

25. A method for making a cryogenic storage tank construction comprising the steps of providing an inner container for containing cryogenic fluid or the like, providing an outer container surrounding said inner container in spaced relation therewith to define a chamber therebetween, forming at least one of said containers of aluminum-containing metallic material, providing a conduit means passing from the exterior of said outer container into the interior of said inner container, providing a first tubular length of aluminum-containing metallic material to form part of said conduit means, providing a second tubular length of stainless steel material to form another part of said conduit means, telescopically arranging said lengths so that at least a portion of one of said tubular lengths surrounds at least a portion of the other tubular length, metallurgically bonding said portions together solely by detonating an explosive charge adjacent said portions, securing said first tubular length to said one container, and operatively interconnecting said second tubular length to said other container whereby said second tubular length spaces said first tubular length from said other container in said chamber so that a transition joint of metallic material having a relatively low coefficient of thermal conductivity is provided between said containers in said chamber, providing a third tubular length of aluminum-containing metallic material, telescoping said second and third lengths so that at least a portion of one of said second and third lengths surrounds at least a portion of the other of said second and third lengths, metallurgically bonding said last-named portions together solely by detonating another explosive charge adjacent said last-named portions, securing said third length to said other container to operatively interconnect said second length thereto, said telescoping steps including the steps of telescopically disposing said first and third tubular lengths onto said tubular lengths in spaced apart and aligned relation, said bonding steps including the steps of metallurgically bonding substantially the entire lengths of said first and third tubular lengths to said second tubular length by said detonated explosive charges whereby said first and third tubular lengths are respectively secured to said containers and are disposed in spaced apart and aligned relation on said second tubular length providing a pair of end plate members, respectively securing said end plate members to the opposed ends of said second tubular length to close said ends, providing an aperture passing through each of said end plate members in aligned relation with each other, and inserting other conduit means through said first-named conduit means by disposing said other conduit means in said aligned apertures to fluidly interconnect the exterior of said outer container with the interior of said inner container.

References Cited

UNITED STATES PATENTS

| | | | |
|---|---|---|---|
| 3,024,526 | 3/1962 | Philipchuk et al. | 29—504 X |
| 3,101,862 | 8/1963 | Matsch | 220—14 |
| 3,105,293 | 10/1963 | Skinner et al. | 29—504 X |
| 3,140,537 | 7/1964 | Popoff | 29—474.3 |
| 3,168,817 | 2/1965 | Beckman et al. | 220—15 X |
| 3,175,284 | 3/1965 | Cotovsky | 29—504 X |
| 3,197,855 | 8/1965 | Carter et al. | 29—470.1 |
| 3,205,573 | 9/1965 | Seal et al. | 29—504 X |
| 3,240,377 | 3/1966 | Dixon | 220—14 |
| 3,263,323 | 8/1966 | Maher et al. | 29—421 X |

JOSEPH R. LECLAIR, *Primary Examiner.*

J. R. GARRETT, *Assistant Examiner.*